United States Patent
Cummings

(10) Patent No.: US 11,128,184 B2
(45) Date of Patent: Sep. 21, 2021

(54) MAGNETIC ROTATING MEMBER AND METHODS RELATING TO SAME

(71) Applicant: Michael Cummings, Nashville, IL (US)

(72) Inventor: Michael Cummings, Nashville, TN (US)

(73) Assignee: Michael Cummings, Nashville, TN (US)

( * ) Notice: Subject to any disclaimer, the term of this patent is extended or adjusted under 35 U.S.C. 154(b) by 90 days.

(21) Appl. No.: 16/446,446

(22) Filed: Jun. 19, 2019

(65) Prior Publication Data

US 2020/0403466 A1 Dec. 24, 2020

(51) Int. Cl.
  *H02K 1/27* (2006.01)
  *H02K 1/28* (2006.01)

(52) U.S. Cl.
  CPC ............. *H02K 1/27* (2013.01); *H02K 1/28* (2013.01)

(58) Field of Classification Search
  USPC ................ 290/55; 310/40 R, 44, 156.01
  See application file for complete search history.

(56) References Cited

U.S. PATENT DOCUMENTS

| | | | |
|---|---|---|---|
| 1,888,056 A * | 11/1932 | Verzillo | B64C 11/16 416/203 |
| 2,994,984 A | 8/1961 | Luchsinger | |
| 3,992,132 A | 11/1976 | Putt | |
| 4,488,075 A | 12/1984 | DeCesare | |
| 5,135,425 A * | 8/1992 | Andrews | A63H 33/26 335/306 |
| 5,237,232 A | 8/1993 | Kitamura | |
| 5,304,881 A | 4/1994 | Flynn | |
| 5,834,872 A * | 11/1998 | Lamb | H02K 49/065 310/103 |
| 5,925,958 A * | 7/1999 | Pirc | H02K 53/00 310/152 |
| 6,140,730 A | 10/2000 | Tkaczyk et al. | |
| 6,814,679 B1 | 11/2004 | Chen | |

(Continued)

FOREIGN PATENT DOCUMENTS

| | | | | |
|---|---|---|---|---|
| CN | 107222042 A | | 9/2017 | |
| DE | 202018003085 | * | 9/2018 | ............. H02K 53/00 |

(Continued)

OTHER PUBLICATIONS

Screen captures from Youtube video clip entitled "Magnet Motor South Korea | ancient technology revealed", 6 pages, uploaded on Dec. 5, 2017, by user "B'c C.m". Retrieved from Internet: <https://www.youtube.com/watch?v=Liz_oNaY0I0>.

(Continued)

*Primary Examiner* — Burton S Mullins
(74) *Attorney, Agent, or Firm* — Fitch, Even, Tabin & Flannery LLP

(57) ABSTRACT

A rotating member comprising a central portion having a center aperture, a first arm extending radially outward from the central portion, the first arm having a length L, a second arm extending radially outward from the central portion, a first magnet mounted on the first arm such that a magnetic field of the first magnet extends into a recess between the first and second arms, and a second magnet mounted on the second arm such that a magnetic field of the second magnet extends into the recess between the first and second arms.

18 Claims, 4 Drawing Sheets

(56) References Cited

U.S. PATENT DOCUMENTS

| | | | | |
|---|---|---|---|---|
| 6,896,492 | B2* | 5/2005 | Masterton | F04D 25/066 310/254.1 |
| 7,095,126 | B2 | 8/2006 | McQueen | |
| 7,151,332 | B2 | 12/2006 | Kundel | |
| 8,847,452 | B1 | 9/2014 | Belanger | |
| 9,413,214 | B2* | 8/2016 | Giummo | H02K 21/00 |
| 9,509,186 | B2* | 11/2016 | Biffard | H02K 1/276 |
| 9,605,686 | B2* | 3/2017 | Hamada | F04D 29/386 |
| 2006/0046878 | A1 | 3/2006 | Yang | |
| 2007/0145846 | A1* | 6/2007 | Vila | F16H 61/24 310/152 |
| 2007/0210659 | A1* | 9/2007 | Long | H02K 49/10 310/80 |
| 2008/0011113 | A1 | 1/2008 | Safran | |
| 2008/0164778 | A1 | 7/2008 | Schieffer | |
| 2010/0181856 | A1* | 7/2010 | Chen | H02K 53/00 310/154.01 |
| 2011/0198958 | A1 | 8/2011 | Kozeka | |
| 2015/0033938 | A1 | 2/2015 | Eriston | |
| 2017/0077781 | A1 | 3/2017 | Sadler | |
| 2018/0342930 | A1* | 11/2018 | Roberts | A63H 1/00 |
| 2020/0403465 | A1* | 12/2020 | Cummings | H02K 7/116 |

FOREIGN PATENT DOCUMENTS

| | | | | | |
|---|---|---|---|---|---|
| GB | 002127232 | A | * | 4/1984 | H02K 25/00 |
| JP | 52038107 | A | * | 3/1977 | H02K 53/00 |
| JP | 60213239 | A | * | 10/1985 | H02K 53/00 |
| WO | 2007079610 | A1 | | 7/2007 | |
| WO | 2008023189 | A1 | | 2/2008 | |
| WO | WO2017168937 | | * | 10/2017 | H02K 25/00 |

OTHER PUBLICATIONS

Davis, Sam et al., "New Discovery Could Lead to Commercial Production of Permanent Magnet Motors," Power Electronics, published electronically Nov. 14, 2017, 15 pages.

Davis, Sam, "Is a Permanent Magnet Motor Feasible?" Power Electronics, published electronically Nov. 18, 2017, 4 pages.

Neil, Dan, "One Man's Unlikely Quest to Power the World with Magnets," The Wall Street Journal, electronically published May 16, 2019, 13 pages.

Notification of Transmittal of the International Search Report and Written Opinion of the International Searching Authority, or the Declaration of the International Bureau of WIPO for corresponding International Application No. PCT/US20/28202, dated Jul. 17, 2020, 24 pages.

U.S. Appl. No. 16/446,410; Office Action dated Apr. 5, 2021; 24 Pages.

* cited by examiner

MAGNETIC ROTATING MEMBER AND METHODS RELATING TO SAME

TECHNICAL FIELD

This invention relates generally to rotating members, and more specifically relates to magnetic rotating members and methods relating to same.

BACKGROUND

Magnetic rotating members, such as rotors, are coupled to a shaft. Outside magnetic fields act on the magnetic rotating member, causing the rotating member to rotate. The rotation of the rotating member causes the shaft to rotate. As such, the magnetic field is converted to kinetic energy by the rotating member, which can be used to drive any number of devices.

Alternatively, the shaft is rotated by another source which causes the rotating member to rotate. The rotation of the rotating member causes the magnetic field of the rotating member to vary. This variance can be used to exert magnetic force on ferromagnetic materials. Alternatively, the variance can be used to induce an electrical current in a coiled conductor.

Existing magnetic rotors have a generally disk or drum shape with magnets spaced about the circumference. The interacting magnetic object, such as the stator in instances of an electric motor, consists of one or more magnets spaced radially outward from the outer wall of the disk or drum.

SUMMARY OF THE INVENTION

A rotating member is provided having a plurality of arms extending outward in a radial direction. The plurality of arms define recesses therebetween. The plurality of arms includes a first arm and a second arm defining a first recess therebetween.

Each arm has at least one magnet. The at least one magnet has a magnetic field extending into a recess adjacent to the arm. The first arm has a first magnet with a magnetic field extending into the first recess. The second arm has a second magnet with a magnetic field extending into the first recess. Accordingly, a magnetically sensitive object within the recess is acted upon by both magnetic fields.

In some embodiments, the rotating member has three arms spaced apart by 120 degrees. The first arm and second arm define a first recess therebetween. The first arm and third arm define a second recess therebetween. The first arm has a first magnet having a magnetic field extending into the first recess. The first arm has a second magnet with a magnetic field extending into the second recess.

In one embodiment, the first magnet is oriented such that a first pole of the first magnet faces the first recess. The second magnet is oriented such that the first pole of the second magnet faces the second recess.

Elements in the figures are illustrated schematically for simplicity and clarity and have not necessarily been drawn to scale or to include all features, options or attachments. For example, the dimensions and/or relative positioning of some of the elements in the figures may be exaggerated relative to other elements to improve understanding of various embodiments of the present invention. Also, common, well-understood elements that are useful or necessary in a commercially feasible embodiment are often not depicted in order to facilitate a less obstructed view of various embodiments of the present invention. Certain actions and/or steps may be described or depicted in a particular order of occurrence while those skilled in the art will understand that such specificity with respect to sequence is not actually required. The terms and expressions used herein have the ordinary technical meaning accorded to such terms and expressions by persons skilled in the technical field as set forth above except where different specific meanings have otherwise been expressly set forth herein.

DETAILED DESCRIPTION

Figure 1A:
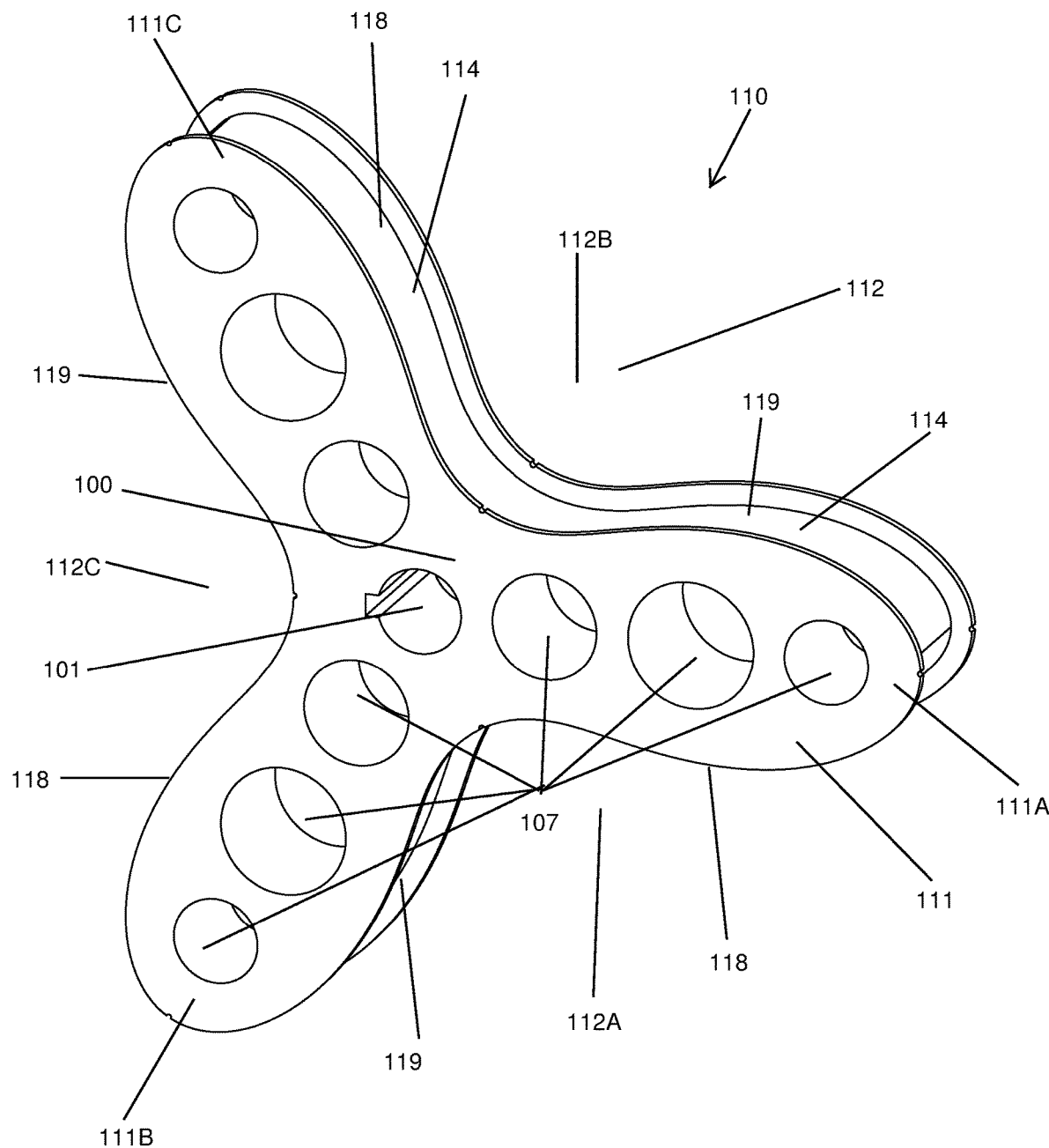
FIG. 1A is a perspective view of a magnetic rotating member in accordance with embodiments of the present invention.
Figure 1B:
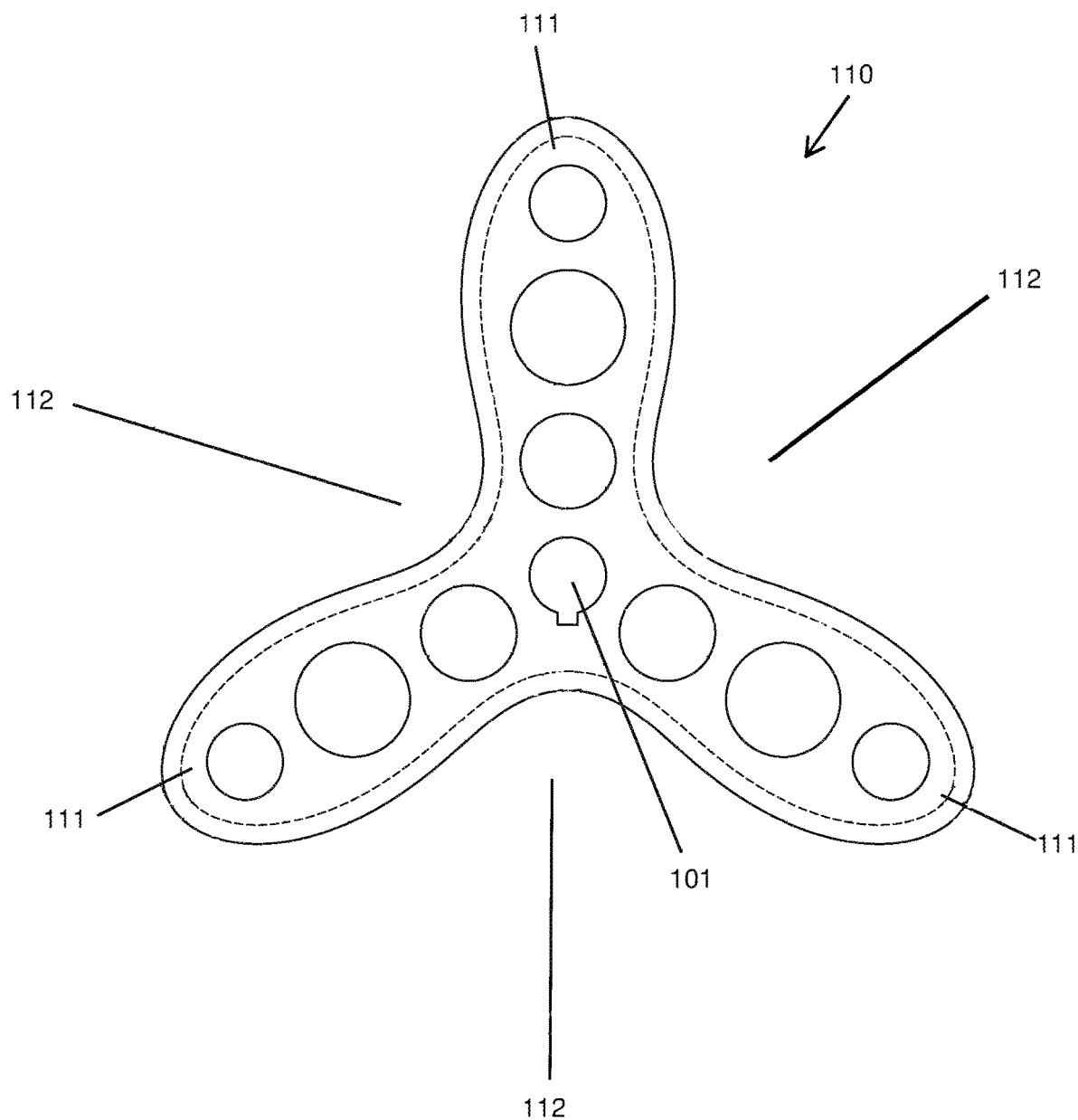
FIG. 1B is an end elevational view of the magnetic rotating member of FIG. 1A.

FIGS. 1A-1B illustrate a rotating member 110. The rotating member 110 has a central portion 100. A central aperture 101 for receiving a main shaft extends through the central portion 100. The aperture 101 is keyed such that the rotating member 110 is securable to the main shaft so as to restrict rotation of the rotating member 110 relative to the shaft. The rotating member 110 is configured to rotate with the main shaft about the axis of central aperture 101.

The rotating member 110 includes a plurality of arms 111 extending radially outward. The shown embodiment includes a first arm 111A, a second arm 111B, and a third arm 111C. The three arms 111A-C are spaced from each other by approximately 120 degrees. It is understood that in alternative embodiments the rotating member 110 may include a different number of arms 111, including more arms or fewer arms than the three-arm embodiment shown.

Between each pair of adjacent arms 111 is a recess 112. A first recess 112A is located between the first arm 111A and the second arm 111B. A second recess 112B is located between the first arm 111A and the third arm 111C. A third recess 112C is located between the second arm 111B and the third arm 111C.

Each arm has a first side 118 facing a first of the two adjacent recesses 112 and a second side 119 facing a second of the two adjacent recesses 112. Each recess 112 is faced by a first side 118 of one arm 111 and a second side 119 of another arm 111.

The arms 111 include magnets 114. The magnets 114 are either permanent magnets or electromagnets. In some forms, the magnets 114 are a combination of the permanent magnets and electromagnets.

In some embodiments, each arm 111 includes a first magnet 114 on the first side 118 and a second magnet 114 on the second side 119. The first magnet 114 has a magnetic field extending into a recess 112 on the first side 118 of the arm 111. The second magnet 114 has a magnetic field extending into the recess 112 on the second side 119 of the arm 111. Accordingly, an object located within the first recess 112A is acted upon by the magnetic field of the magnet 114 on the first side 118 of the first arm 111A and by the magnetic field of the magnet 114 on the second side 119 of the second arm 111B.

In one form, the magnets 114 are oriented such that a pole of the magnets 114 faces outward from the arms 111 and towards the adjacent recess 112. A first pole 114A (see FIG. 2) of the magnets 114 face outward into the recesses 112.

Figure 2:
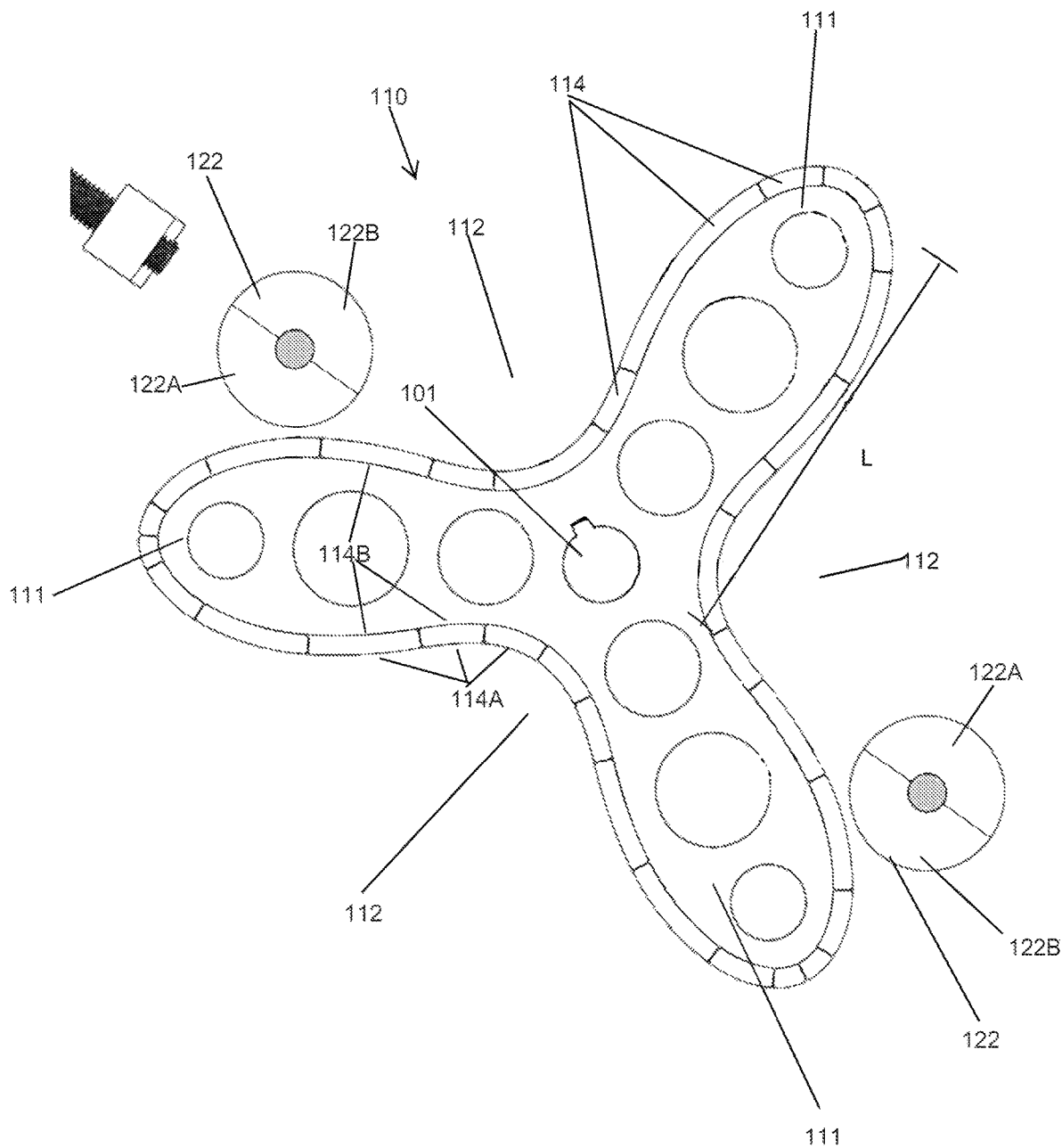
FIG. 2 is a front elevational view of the rotating member of FIGS. 1A-1B with additional external magnets.

Turning to FIG. 2, the rotating member 110 has three or more arms 111 spaced at an equal angular distance apart from each other. Adjacent arms 111 define a recess or cavity 112 therebetween. The arms 111 are at least partially covered on the surface parallel to the axis of the main shaft (not shown) of aperture 101 with magnets 114 mounted thereto. The magnets 114 extend along each arm and face inward towards the recesses 112. In one embodiment each magnet 114 is oriented such that a first pole 114A points outward from the rotating member 110 and a second pole 114B points inward toward the aperture 101 of rotating member 110.

In one embodiment, the arms 111 are formed of a ferromagnetic material, such as iron or steel. As such, the arms 111 act as a magnetic shield, shielding the inward facing pole of the magnets 114.

Magnets 122, such as piston mounted magnets, are movable relative to the rotating member 110. The magnets 122 are movable between a first position less than L distance from the central aperture 101 to a second position greater than L distance from the central aperture 101. The magnets 122 move between the first and second positions as the rotating member 110 rotates so as to move inward to extend into the recesses 112 and move outward so as to avoid contacting the arms 111 of rotating member 110 rotates.

In one embodiment, the magnets 122 are oriented such that the poles are perpendicular to the longitudinal axis of the main shaft extending through the aperture 101. When an arm 111 is pointed directly at a magnet 122, the poles of the magnet 122 are also perpendicular to the longitudinal axis of the arm 111. Accordingly, when a magnet 122 is positioned within a recess 112, the first pole 122A faces a first arm 111 and the second pole 122B faces a second arm. The first arm 111 is repelled by the magnet 122 and the second arm 111 is attracted to the magnet 122, which causes the rotating member to rotate. As shown, the two magnets 122 are flipped relative to each other such that they both cause the rotating member 110 to rotate in the same direction (counter clockwise from the point of view of FIG. 2).

Returning to FIGS. 1A-1B, the arms 111 have a generally rounded shape. The arms 111 are wider near the middle of their length and become narrower as they extend towards their tips and towards the center of the rotating member 110. Accordingly, the arms 111 have a first width at a middle point along their length, a second width proximate the central portion 100, and a third width distal from the central portion 100. The first width is greater than the second width or the third width.

The arms 111 include a number of apertures 107. The apertures 107 are circular holes extending through the arms 111 in a direction parallel to the axis of rotation. The apertures 107 reduce the overall mass of the rotating member 110, thus increasing the amount of acceleration achieved from a force.

In alternative embodiments, each arm 111 has a single magnet 114. The magnet 114 has a first pole facing outward on the first side 118 and a second pole facing outward on the second side 119. In one form, the magnets 114 are electromagnets. The polarity of the electromagnets 114 can be reversed by reversing the flow of electricity through the electromagnet 114.

Figure 3:
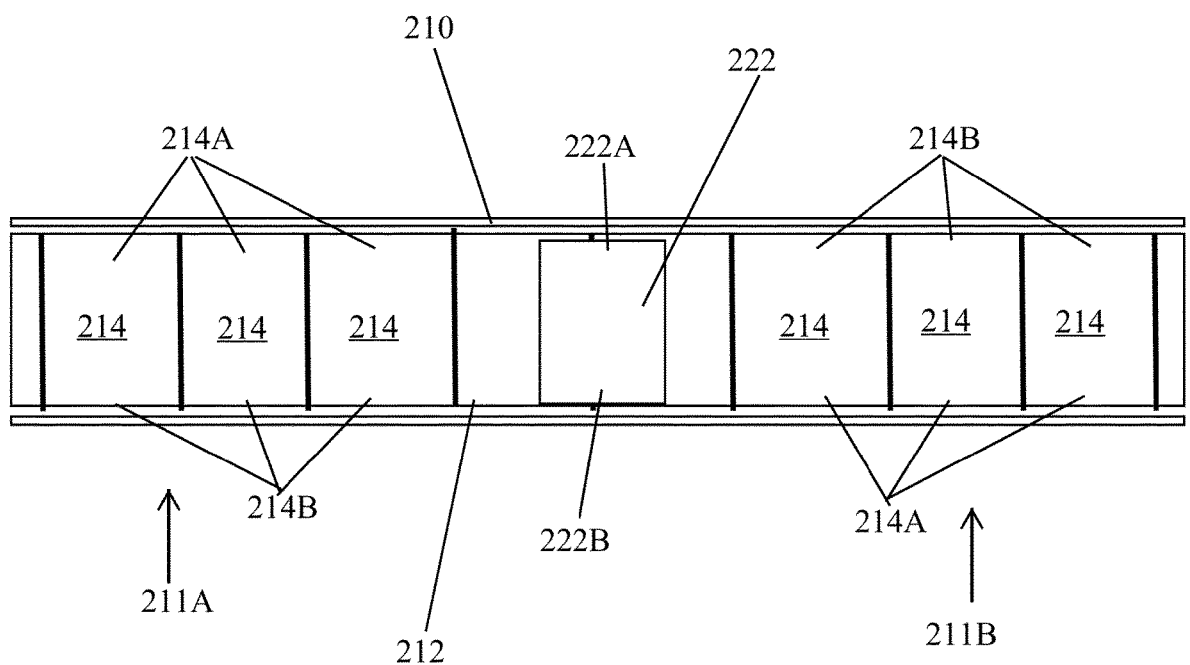
FIG. 3 is a schematic, end elevation view of a rotating member in accordance with another embodiment shown with an external magnet.

FIG. 3 illustrates an alternative embodiment of a rotating member 210 and piston-mounted magnet 222. The rotating member 210 has a plurality of arms 211, such as three arms as with the rotating members 110 above. Because FIG. 3 is a side view, only two arms 211A, 211B are visible. The arms 211A, 211B of the rotating member 210 are at least partially covered on surfaces parallel with the axis of rotation with magnets 214. The magnets 214 are oriented such that the poles of the magnets point in opposite directions that are parallel to the axis of rotation.

Referring further to FIG. 3, the piston mounted magnets 222 are similarly oriented such that the poles of the magnet 222 point in directions generally parallel with the axis of rotation of the rotating member 210. The magnet 222 has a first pole 222A and a second pole 222B. Similarly, the magnets 214 have first poles 214A and second poles 214B. Adjacent surfaces of the arms 211A, 211B have the magnets 214 flipped relative to each other, meaning that from the point of view of a recess 212, the outward facing surfaces of the two arms 211 have magnets 214 in opposite orientations. Similarly, for each arm 211, the two sides of the arm having magnets 214 in opposite orientation. As such, each first side of an arm 211 (such as the first sides 118 of the arms 111 above) has the magnets 214 in the first orientation, and each second side of an arm 211 (such as the second sides 119 of the arms 111 above) has magnets 214 in the second orientation.

As a reciprocating piston magnet 222 travels along one full path toward and away from aperture 101 with respect to each of the three arms, it passes by six surfaces (the two sides of each of the three arms 211), which alternate between the two orientations. When the magnet 222 is in the recess 212 between the first and second arms 211A, 211B, the first poles 214A on the first arm 211A align with the first pole 222A of the magnet 222, and the first poles 214A on the second arm 211B align with second pole 222B of the magnet 222.

Accordingly, the magnets 214 of the first arm 211A are repelled by the magnet 222, and the magnets 214 of the second arm 211B are attracted to the magnet 222. This attraction and repulsion causes the rotating member to rotate.

The rotating member 210 and magnet 222 can be used in place of the rotating members 110 and magnets 122 in a motor (not shown). The operation of the rotating member 210 and piston 222 is unchanged from the description above regarding rotating members 110, arms 111A-C, and magnets 122A-B. Alternating surfaces of the arms 211 of the rotating member 210 have the orientation of the magnets 214 flipped. For example, the back side of the arm 211A (from the point of view of FIG. 3) has magnets oriented the same as the shown surface of the arm 211B. With reference to FIGS. 1A-1B, each first surface 118 has magnets in a first orientation, and each second surface 119 has magnets in the second, flipped orientation. This causes the rotating member 210 to continue to rotate as each arm passes the magnet 222.

The above described embodiments have magnets mounted on all three arms of the rotating members. In one embodiment, each of these magnets is a permanent magnet. In alternative forms, one or more of the magnets is replaced with electromagnets. The flow of electricity through the arm mounted magnets 114 can be varied as the arms rotate in order to optimize the amount of net positive force. In one embodiment, each arm has a single electromagnet 114. As the electromagnet 114 passes by a piston mounted magnet 122, the flow of electricity is reversed causing the polarity of the electromagnet 114 to reverse. This causes the arm which was previously being attracted to the piston magnet 122 to then be repelled by the magnet 122.

The rotating members 110 can be used in a number of applications. In one embodiment, the rotating members 110 are used in a magnet motor with piston mounted magnets. Exemplary magnet motors are shown in U.S. application Ser. No. 16/446,410 filed Jun. 19, 2019, with the inventor Michael Cummings. This reference is hereby incorporated by reference in its entirety. The motor is used to power a number of devices, such as tools, vehicles, or generators. In alternative forms, the rotating member is used in a generator.

In addition, the description of devices described herein are understood to enable one to carry out methods relating to the devices. For example, methods of using the rotating member, methods of generating electricity, and methods of manufacturing the rotating members are all considered and disclosed herein.

What is claimed is:

1. A rotating member comprising:
   a first arm extending radially outward from a central portion, the first arm having a first surface on a first side of the first arm and a second surface on a second side of the first arm, the first and second surfaces of the first arm at least partially forming a periphery of the first arm, the first arm further having at least one aperture extending therethrough;
   a second arm extending radially outward from the central portion, the second arm having a first surface on a first side of the second arm and a second surface on a second side of the second arm, the first and second surfaces of the second arm at least partially forming a periphery of the second arm, the first surface of the second arm facing a first recess between the first surface of the second arm and the second surface of the first arm, the second arm further having at least one aperture extending therethrough;
   a third arm extending radially outward from the central portion;
   one or more first magnets covering a majority of the first side of the first arm, wherein at least one of the one or more first magnets is positioned on the first surface of the first arm; and
   one or more second magnets covering a majority of the second side of the second arm, wherein at least one of the one or more second magnets is positioned on the second surface of the second arm.

2. The rotating member of claim 1 wherein at least one of the one or more first magnets has a first pole facing the first recess.

3. The rotating member of claim 2 wherein at least one of the one or more second magnets has a first pole facing the first recess.

4. The rotating member of claim 3 wherein the first pole of the at least one first magnet is a north pole and the first pole of the at least one second magnet is a north pole.

5. The rotating member of claim 3 wherein the first pole of the at least one first magnet is a south pole and the first pole of the at least one second magnet is a south pole.

6. The rotating member of claim 1 wherein at least one of the one or more first magnets has a first pole facing a first direction parallel to an axis of rotation of the rotating member and a second pole facing a second, opposite direction parallel to the axis of rotation, and
   wherein at least one of the one or more second magnets has a first pole facing the first direction and a second pole facing the second direction.

7. The rotating member of claim 1 wherein the third arm has a second surface facing a third recess between the third arm and the first surface of the second arm, and the third arm further having a first surface facing a second recess between the third arm and the second surface of the first arm.

8. The rotating member of claim 1 wherein the first arm, the second arm, and the third arm are circumferentially spaced apart by 120 degrees.

9. The rotating member of claim 1 wherein the first and second arms are formed of a ferromagnetic material.

10. A rotating member comprising:
    a central portion having a central aperture, the central aperture configured to receive a main shaft therethrough;
    a first arm extending radially outward from the central portion, the first arm having a length L;
    a second arm extending radially outward from the central portion;
    one or more first magnets mounted on a periphery of the first arm such that a magnetic field of at least one of the one or more first magnets extends into a first recess between the first and second arms; and
    one or more second magnets mounted on a periphery of the second arm such that a magnetic field of at least one of the one or more second magnets extends into the first recess between the first and second arms;
    wherein the one or more second magnets cover a majority of a second side of the second arm, and wherein the one or more first magnets cover a majority of a first side of the first arm.

11. The rotating member of claim 10 wherein at least one of the one or more first magnets has a first pole facing the first recess.

12. The rotating member of claim 11 wherein at least one of the one or more second magnets has a first pole facing the first recess.

13. The rotating member of claim 12 wherein the first pole of the at least one first magnet is a north pole and the first pole of the at least one second magnet is a north pole.

14. The rotating member of claim 12 wherein the first pole of the at least one first magnet is a south pole and the first pole of the at least one second magnet is a south pole.

15. The rotating member of claim 10 wherein at least one of the one or more first magnets has a first pole facing a first direction parallel to an axis of rotation of the rotating member and a second pole facing a second, opposite direction parallel to the axis of rotation, and
    wherein at least one of the one or more second magnets has a first pole facing the first direction and a second pole facing the second direction.

16. The rotating member of claim 10 further comprising a third arm extending radially outward from the central portion.

17. The rotating member of claim 16 wherein the third arm has a second surface facing a third recess between the third arm and the first surface of the second arm, and the third arm further having a first surface facing a second recess between the third arm and the second surface of the first arm.

18. The rotating member of claim 10 wherein the first and second arms are formed of a ferromagnetic material.

* * * * *

UNITED STATES PATENT AND TRADEMARK OFFICE
CERTIFICATE OF CORRECTION

| | |
|---|---|
| PATENT NO. | : 11,128,184 B2 |
| APPLICATION NO. | : 16/446446 |
| DATED | : September 21, 2021 |
| INVENTOR(S) | : Michael Cummings |

It is certified that error appears in the above-identified patent and that said Letters Patent is hereby corrected as shown below:

On the Title Page

(71) Applicant: Change "Nashville, IL" to -- Nashville, TN --.

Signed and Sealed this
Nineteenth Day of April, 2022

Katherine Kelly Vidal
*Director of the United States Patent and Trademark Office*